United States Patent [19]

Nakatani

[11] Patent Number: 4,817,174

[45] Date of Patent: Mar. 28, 1989

[54] IMAGE PROCESSING APPARATUS

[75] Inventor: Munehiro Nakatani, Toyohashi, Japan

[73] Assignee: Minolta Camera Kabushiki Kaisha, Osaka, Japan

[21] Appl. No.: 5,658

[22] Filed: Jan. 21, 1987

[30] Foreign Application Priority Data

Jan. 25, 1986 [JP] Japan .................... 61-14329

[51] Int. Cl.$^4$ .............................. G06K 9/36
[52] U.S. Cl. ...................... 382/22; 358/283; 382/27
[58] Field of Search ........ 382/21, 22, 27, 52, 382/53, 54; 358/284, 283

[56] References Cited

U.S. PATENT DOCUMENTS

| 4,414,581 | 11/1983 | Kato .................... 358/283 |
| 4,498,104 | 2/1985 | Schulz .................. 382/54 |
| 4,501,016 | 2/1985 | Persoon ................. 382/22 |
| 4,570,180 | 2/1986 | Baier ................... 382/22 |

FOREIGN PATENT DOCUMENTS

| 59-43672 | 5/1984 | Japan . |
| 59-90461 | 10/1984 | Japan . |
| 0009770 | 1/1986 | Japan .................... 382/22 |

Primary Examiner—Leo H. Boudreau
Attorney, Agent, or Firm—Burns, Doane, Swecker & Mathis

[57] ABSTRACT

An image processing apparatus includes a density detector for detecting the density of an image by a CCD. The CCD has a plurality of sets of pixels, each set of pixels is defined by the neighboring pixels. The apparatus also includes a calculator for calculating the sum of the image densities detected by the pixels of each set and for further calculating a difference between the sums. If the difference is greater than a predetermined level, it means that the contour is present between the sets of pixels. An image processing unit is provided for increasing or decreasing the density of the image for the contour enhancement when the contour is detected.

10 Claims, 3 Drawing Sheets

IMAGE PROCESSING APPARATUS

BACKGROUND OF THE INVENTION

1. Field of Technology

The present invention relates to the intermediate tone processing of a digital image data.

2. Description of the Prior Art

In an image processing apparatus such as an image reader or the like, an image of the original is read out by an image sensor such as, for example, a CCD (charge-coupled device) line sensor and, then, the image information so read out is digitized. The digitized image information is reproduced by means of an output device such as, for example, a laser printer.

In the case of an image of intermediate tone, an intermediate tone processing such as by means of a dither method is carried out at the time the image information is digitized. In general, when the intermediate tone processing is effected, the resolution tends to be lowered accompanied by the lowering of the contrast.

The human sense of sight is more sensitive to the contour of any image and, therefore, one will be unfavorably impressed if an image represents an indistinct contour.

In view of the foregoing, various attempts have hitherto been made to enhance the contour. By way of example, the Japanese Laid-open Patent Publication No. 59-43672, published in 1984, discloses an image processing device wherein the contour can be enhanced by means of one-dimensional convolution integration. On the other hand, according to the Japanese Laid-open Patent Publication No. 59-90461, published in 1984, a ROM conversion table is used to enhance the contour. The conventional method of the enhancement of the contour requires the use of a line memory or any other device such as ROM, rendering the apparatus as a whole to be complicated.

SUMMARY OF THE INVENTION

The present invention has for its objects to provide an improved image processing apparatus wherein an edge portion of a digital image data is detected to effect the enhancement.

In order to accomplish the above described object, the present invention provides an improved image processing apparatus which comprises: an image sensor including a plurality of pixels in which neighboring pixels define a set of pixels; a calculating means for calculating the sum of the image densities detected by the pixels in each set and for calculating the difference between the sums of the image densities detected by the neighboring sets of the pixels, such that said calculating means detects the contour of the image when the absolute value of such difference is greater than a predetermined value; means for processing said image so as to increase or decrease the density of the image for the contour enhancement when the contour is detected by said calculating means; and a digitized means for digitized the image density of the image whose contour has been enhanced by the image processing means.

The detection of the contour is carried out by dividing the pixels of the image sensor into a plurality of sets each comprised of the neighboring pixels, determining the sum of the image densities detected by the neighboring pixels of each set, and determining the presence of the contour when the sum of the image densities detected by the pixels of the neighboring sets varies an extent greater than a predetermined value. Then, the density of the pixels adjacent the contour is increased or decreased to effect the enhancement of the contour.

Both of the contour detecting and the contour enhancement can be dealt with by a hardware and a real-time basis.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
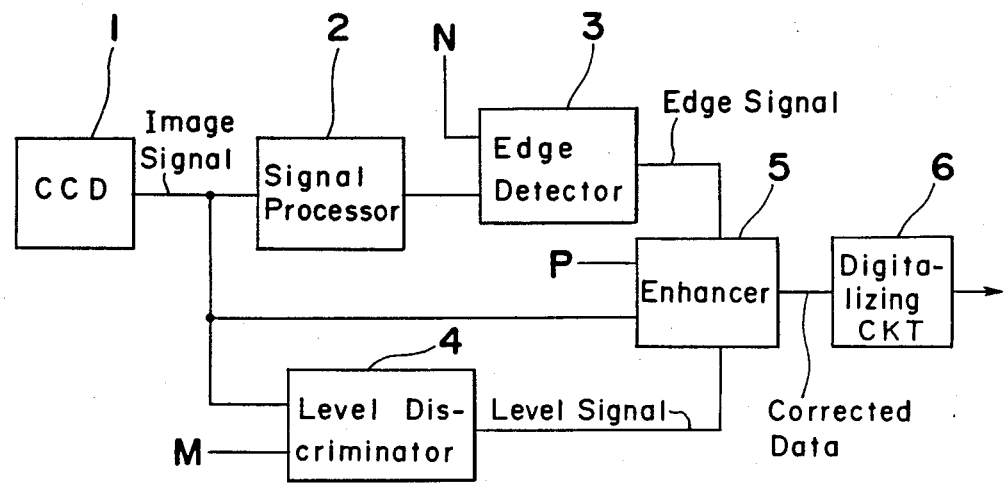
FIG. 1 is a block diagram showing a system for carrying out a contour enhancement.

A contour enhancing system is shown in FIG. 1. A CCD line sensor 1 has a plurality of pixel elements (hereinafter referred to as pixels) divided into a plurality of sets each set comprised of a plurality of the neighboring pixels. A signal processing unit 2 in a stage following the CCD line sensor 1 is operable to determine the sum of image signals fed from the respective pixels of each set and then to determine the absolute value of the difference between the sum of the image signals of one set and that of the next adjacent set. An edge detecting unit 3 is operable to compare the absolute value so calculated with a predetermined value N and to generate an edge signal in the event that the absolute value is greater than the predetermined value N. The edge signal generated from the edge detecting unit 3 is descriptive of the detection of the contour. On the other hand, a level discriminating unit 4 is operable to compare the image signal from each pixel with a predetermined value M and also to generate a level signal in the event that the image signal is greater than the predetermined value M. A contour enhancing unit 5 is operable to perform either an addition or a subtraction of a predetermined value P to the pixel from which the edge signal has been generated, that is, the pixel from which the contour has been deteced, in dependence on whether or not the level signal has been outputted. Thereafter, the contour enhancing unit 5 supplies to a digitizing unit 6 the image signal representative of the image of which contour has been enhanced. In the digitizing unit 6, the image signal is digitized by the use of an intermediate tone processing technique such as, for example, a dither method, which signal is in turn outputted to a printer or any other outputting device. In this way, the digitized image in which the contour has been enhanced can be obtained.

Figure 2:
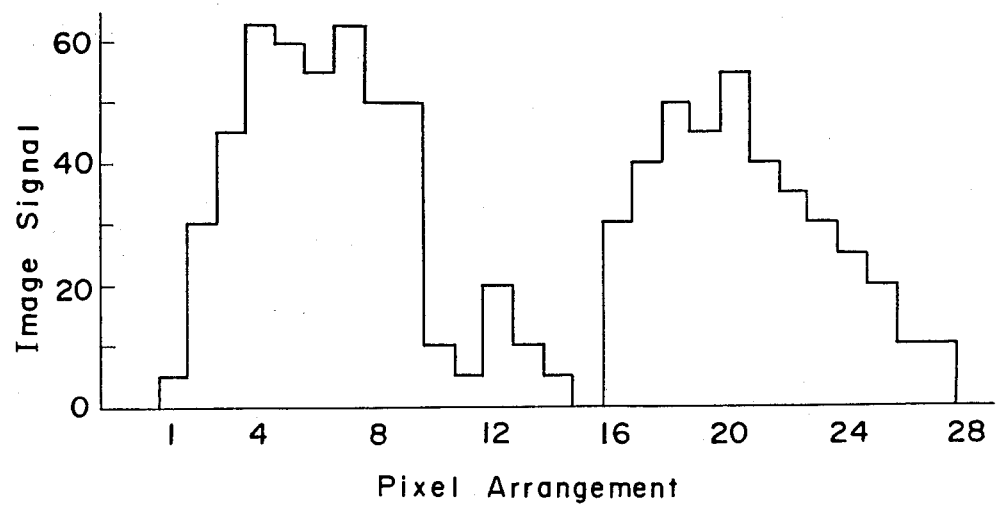
FIG. 2 is a graph showing an example of an image signal.

The details of the contour enhancing technique will now be described. Let it be assumed that the CCD line sensor has 28 pixels and the analog-to-digital converted values of respective amounts of light received by those pixels (image signals) are such as shown in the graph of FIG. 2. These values are normalized to 64 steps (six bits).

Figure 3:
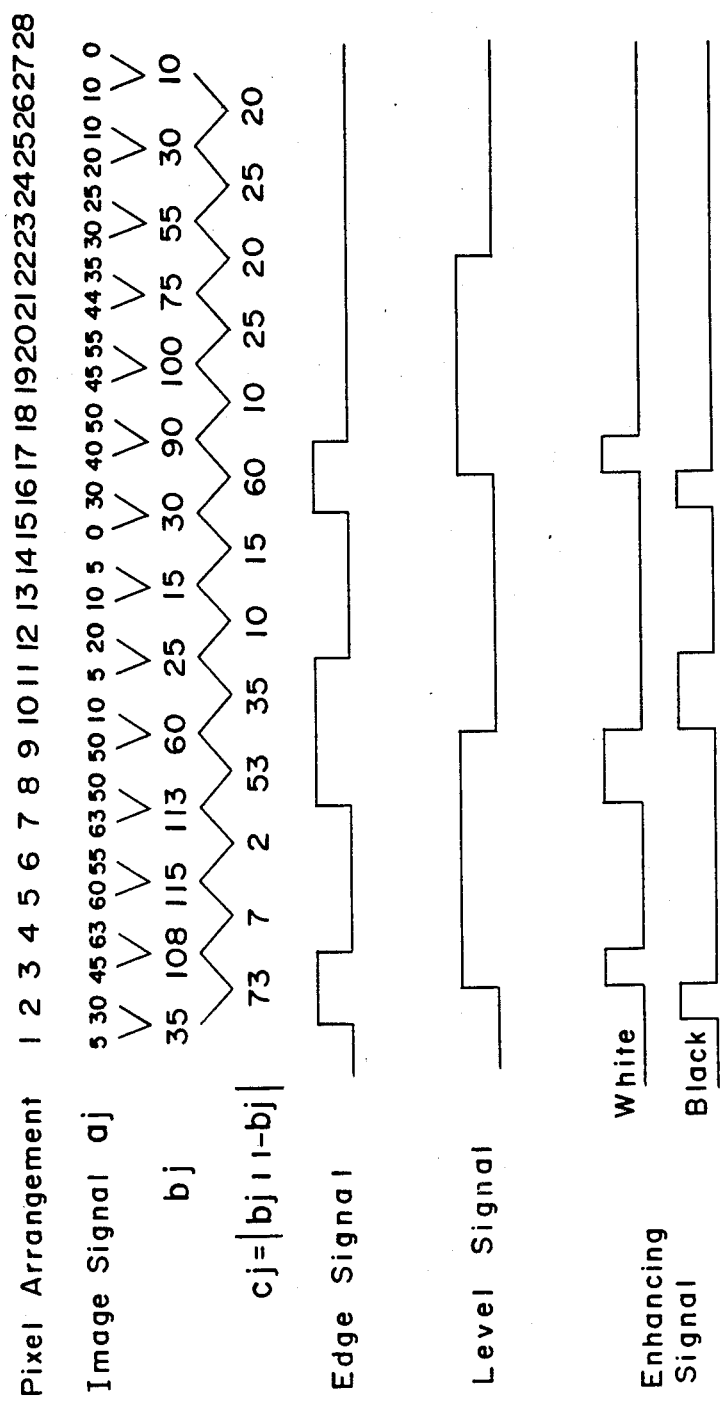
FIG. 3 is a diagram used to explain the contour enhancement of the image signal.

In the first place, as shown in FIG. 3, assuming that each set of the pixels is comprised a pair of the neighboring pixels $a_i$ and $a_{i+1}$, wherein $(i+1)/2=1, 2, 3,\cdots$, the sum $b_j$ of the image signals $a_i$ and $a_{i+1}$ wherein $j=(i+1)/2=1, 2, 3,\cdots$ in each set is determined. By way of example, the sum $b_1$ of the image signals in the set comprised of the first and second pixels is $(5+30=35)$. Then, the absolute value $C_j$ (wherein $j=1, 2, 3,\cdots$) of the difference between the sum $b_j$ of the set of the pixels and the sum $b_{j+1}$ of the next adjacent set of the pixels is determined. That is, $C_j=|b_{j+1}-b_j|$. By way of example, the absolute value associated with the first and second sets of the pixels is $C_1=|108-35|32\ 73$, and that associated with the second and third sets of the pixels is $C_2=|115-108|=7$.

The edge signal is a signal descriptive of the presence of the contour, and, with respect to the $2_j$-th and $2_{j+1}$-th pixels, it will be of a high level when $C_j$ is higher than a predetermined edge level N. Assuming, for example, that N=32, the pixels from which the edge signals are outputted are the 2nd, 3rd, 8 to 11th, 16th and 17th pixels as shown in FIG. 3.

Figure 4:
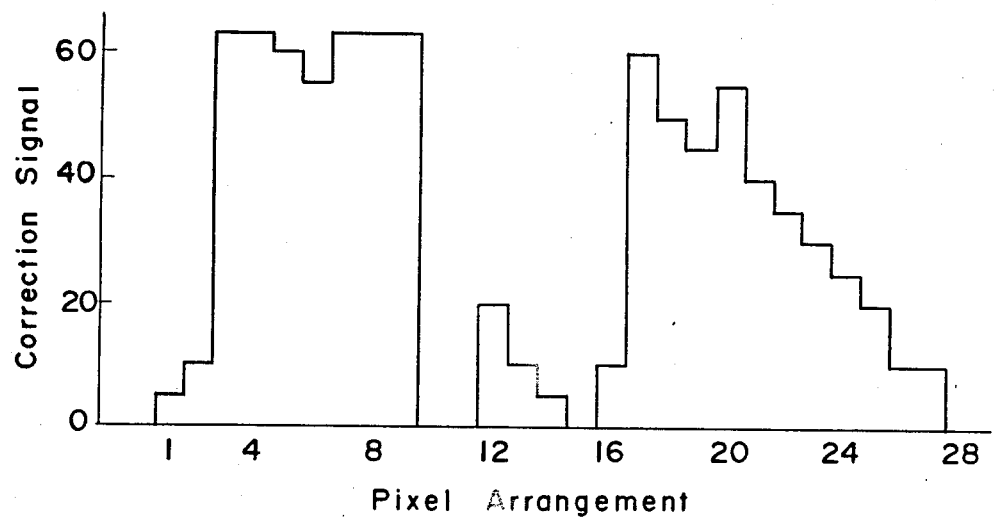
FIG. 4 is a graph showing the image signal after the contour enhancement has been effected.

Thereafter, determination is made to determine if the pixel of interest from which the edge signal has been outputted is greater than a threshold value M, and the image signal is subsequently weighted. In the example shown in FIG. 3, assuming that M=32, if the result of comparison of the image signal $a_i$ is each pixel with the threshold value indicates that the image signal $a_i$ is greater than the threshold value M, the level signal is outputted. With respect to the pixels from which the respective edge signals have been outputted, where the level singal is outputted, a white enhancing signal is outputted, but where the level signal is not outputted, a black enhancing signal is outputted. With respect to the pixel from which the white enhancing signal is outputted, the previously mentioned predetermined quantity P (which quantity is assumed to be 20 in the instance now under discussion) is added to the image signal $a_i$, but with respect to the pixel from which the black enhancing signal is outputted, the previously mentioned quantity P is subtracted from the image signal $a_i$. The signal so obtained is such that the contour has been enhanced as shown in FIG. 4.

Figure 5:
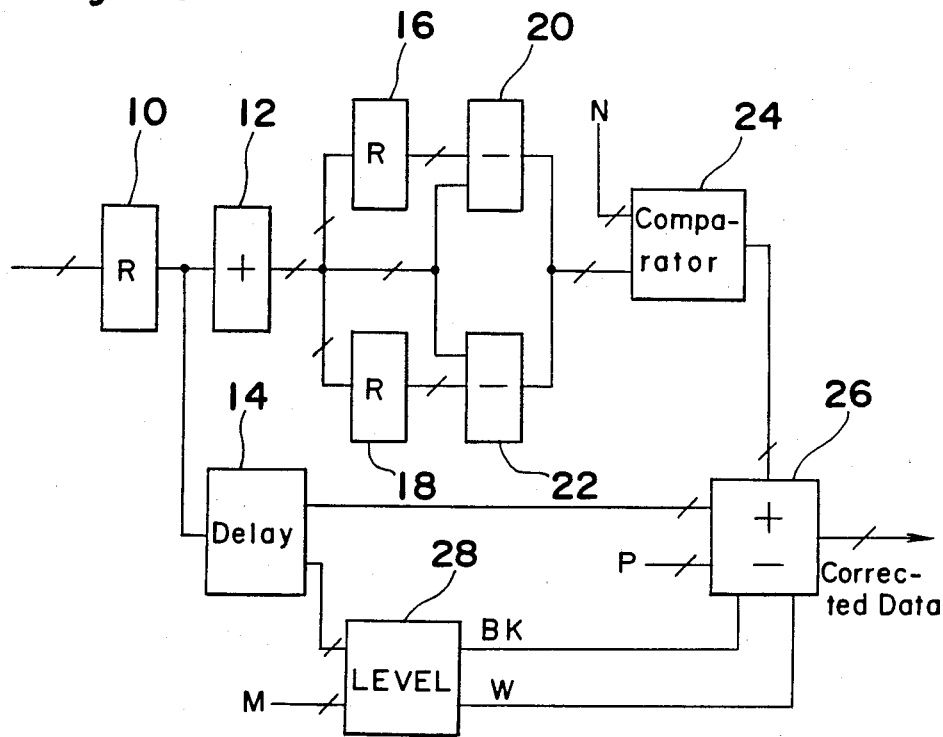
FIG. 5 is a block diagram showing a contour enhancing circuit.

A circuit effective to perform the above described contour enhancing technique on a real-time basis is shown in FIG. 5. The image signal (six bits) $a_i$ generated from each pixel of the CCD line sensor is supplied to a sequence register 10. The register 10 stores the image signals $a_i$ so supplied thereto, and then supplies them to both an adder 12 and a delay circuit 14.

The adder 12 is operable to sum the two image signals, applied thereto in succession, and then to transfer them to registers 16 and 18 and subtractors 20 and 22. The data storage of the register 16, the subtraction of the subtractor 22 and the outputting of respective results of the subtraction are carried out in synchronism with a first clock timing. On the other hand, the data storage of the register 18, the subtraction of the subtractor 20 and the outputting of respective results of the subtraction are carried out in synchronism with a second clock timing. The first and second clock timings are alternately provided. A comparator 24 is operable to compare the absolute value, fed from either the subtractor 20 or the subtractor 22 with the predetermined value N and to apply a signal (the edge signal) to an adding and subtracting circuit 26 in response to the next succeeding two clock timing in the event that the result of comparison indicates that the absolute value is greater than the predetermined value N.

The delay circuit 14 is operable to delay the image signal $a_i$, fed from the register 10, for a period of time corresponding to the three clock timings before it is applied to both of the adding and subtracting circuit 26 and a level determining circuit 28. Accordingly, when the register 10 supplies, for example, an image signal $a_5$ to the adder 12, the delay circuit 14 supplies an image signal $a_2$ to both of the adding and subtracting circuit 26 and the level determining circuit 28. The comparator 24 applies the edge signal corresponding to the image signal $a_2$ to the adding and subtracting circuit 26.

The level determining circuit 28 compares the image signal $a_i$ applied thereto with a predetermined level M and supplies the white enhancing signal W or the black enhancing signal BK to the adding and subtracting circuit 26 depending on whether it is greater or smaller than the predetermined level M.

The adding and subtracting circuit 26 when receiving the edge signal from the comparator 24 performs the addition or the subtraction of the predetermined quantity P, depending on whether the enhancing signal is the white enhancing signal W or whether the enhancing signal is the black enhancing signal BK, subject to the image signal fed from the delay circuit 14, and then supplies an output to a digitizing circuit not shown. In the event that no edge signal is received, the image information from the delay circuit 14 is supplied direct to the digitizing circuit.

It is to be noted that the circuit shown in FIG. 5 is given an operating timing by a timing controller not shown.

In describing the embodiment of the present invention as hereinbefore described, reference has been made to the image processing in a primary scanning direction. However, a description similar to the above can equally apply even to the image processing in a secondary scanning direction.

Thus, according to the present invention, the contour enhanced image can be obtained on a real-time basis with the use of a simplified construction.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus which comprises:
    an image sensor including a plurality of pixels in which neighboring pixels define a set of pixels, each of said pixels operative to detect an image density and produce an indication of the image density at said pixel;
    a calculating means for calculating a sum of the image densities detected by the pixels in each set and for calculating the difference between the sums of the image densities detected by neighboring sets of the pixels, such that said calculating means detects the contour of the image when the absolute value of such difference is greater than a predetermined value; said calculating means comprising adding means for adding said image densities detected by the pixels in each set and for producing the sum thereof;

first and second storing means for alternately storing the sums obtained from said adding means;

first and second subtracting means for subtracting and alternately obtaining a first difference between the sum stored in said first storing means and a first subsequently obtained sum from the adding means and a second difference between the first subsequently obtained sum stored in said second storing means and a second subsequently obtained sum from the adding means;

means for processing said image so as to increase or decrease the density of the image for contour enhancement when the contour is detected by said calculating means; and a digitizing means for digitizing the image density of the image whose contour has been enhanced by the image processing means.

2. An image processing apparatus as claimed in claim 1, wherein said calculating means further comprises:

first comparing means for comparing said first and second differences with a first predetermined amount and for producing a contour signal when the absolute value of either of said first and second differences is greater than said first predetermined amount whereby said calculating means detects the contour of the image.

3. An image processing apparatus as claimed in claim 2, wherein said processing means comprises:

delay means for delaying said image density by a sequence time of three pixels;

second comparing means for comparing the level of said image density from said delay means with a second predetermined amount thereby detecting whether the category of said image density is black or white; and enhancing means for enhancing said image density from said delay means toward black or white as detected by said second comparing means when said contour signal is produced.

4. An image processing apparatus as claimed in claim 1, wherein the digitizing means effects a half tone processing.

5. An image processing apparatus as claimed in claim 4, wherein the half tone processing is conducted by using a dither method.

6. A method for processing images from an image sensor including a plurality of pixels in which neighboring pixesl define a set of pixels, each of said pixels operative to detect an image density and produce an indication of the image density at said pixel, comprising the steps of:

calculating a sum of the image densities detected by the pixels in each set and calculating the difference between the sums of the image densities detected by neighboring sets of the pixels, such that the contour of the image is detected when the absolute value of such difference is greater than a predetermined value;

adding said image densities detected by the pixels in each set and producing the sum thereof;

alternately storing the sums obtained from said adding step in a first and a second storage device;

subtracting and alternately obtaining a first difference between the sum stored in said first storing means and a first subsequently obtained sum from the adding step and a second difference between the first subsequently obtained sum stored in said second storing means and a second subsequently obtained sum from the adding step;

processing said image so as to increase or decrease the density of the image for contour enhancement when the contour is detected in said calculating step; and digitizing the image density of the image whose contour has been enhanced by the image processing means.

7. The method of claim 6, further including the step of:

comparing said first and second differences with a first predetermined amount and producing a contour signal when the absolute value of either of said first and second differences is greater than said first predetermined amount.

8. The method of claim 7, wherein said processing step includes:

delaying said image density by a sequence time of three pixels;

comparing the level of said image density from said delay step with a second predetermined amount thereby detecting whether the category of said image density is black or white; and enhancing said image density from said delay step toward black or white as detected in the immediately preceding comparing step when said contour signal is produced.

9. The method of claim 6, wherein said digitizing step includes effecting a half tone processing.

10. The method of claim 9, wherein said half tone processing is conducted by a dither method.

* * * * *